United States Patent
Malyshev et al.

(10) Patent No.: US 7,599,492 B1
(45) Date of Patent: Oct. 6, 2009

(54) FAST CRYPTOGRAPHIC KEY RECOVERY SYSTEM AND METHOD

(75) Inventors: Andrey E. Malyshev, Moscow (RU); Dmitry V. Sklyarov, Moscow (RU); Vladimir Y. Katalov, Moscow (RU); Ivan V. Golubev, Moscow (RU)

(73) Assignee: Elcomsoft Co. Ltd., Moscow (RU)

( * ) Notice: Subject to any disclaimer, the term of this patent is extended or adjusted under 35 U.S.C. 154(b) by 788 days.

(21) Appl. No.: 11/279,909

(22) Filed: Apr. 17, 2006

(51) Int. Cl.
  *H04K 1/04* (2006.01)
  *H04L 9/00* (2006.01)
  *G06F 11/30* (2006.01)

(52) U.S. Cl. .......................... 380/37; 713/189; 713/190; 713/191; 713/192; 713/193; 726/27; 726/28; 726/29; 726/30

(58) Field of Classification Search ............... 380/37
See application file for complete search history.

(56) References Cited

U.S. PATENT DOCUMENTS

2002/0159598 A1 * 10/2002 Rubinstein et al. .......... 380/259
2003/0115477 A1 * 6/2003 Baldwin et al. ............. 713/193

OTHER PUBLICATIONS

Phillipe ("Making a Faster Cryptanalytic Time-memory Trade-Off", 2003).*

Philip Oechslin, Making a Faster Cryptanalytic Time-Memory Trade-Off, 2003.

Clark, Beginning To See The Light, http://www.beginningtoseethelight.org/ntsecurity/index.php, Apr. 2005.

* cited by examiner

*Primary Examiner*—Longbit Chai
(74) *Attorney, Agent, or Firm*—Bardmesser Law Group (57) ABSTRACT

A system, method and computer program product for recovering a key used to produce a ciphertext document from a plaintext document, including, in the ciphertext document encrypted using an N-bit key, identifying location of an M-bit control value; converting the control value to an M-bit portion of a gamma that corresponds to (a) the ciphertext document and (b) the N-bit key; accessing a file that corresponds to the M-bit portion of the gamma, wherein the file includes approximately $2^{N-M}$ keys that correspond to the M-bit portion of the gamma out of the $2^N$ keys; testing the $2^{N-M}$ keys using a cryptographic key validity function, until a valid key is found; and decrypting the ciphertext document using the valid key to produce the plaintext document. The keys in the file can be tested sequentially. The file can be requested from a server prior to accessing it, or can be local. The name of the file can include the M-bit portion of the gamma. The ciphertext document can be encrypted, for example, using a symmetric stream cipher. In one example, N=40 and M=16. More generally, usually M<N.

18 Claims, 7 Drawing Sheets

FIG. 1

Conventional Art

FAST CRYPTOGRAPHIC KEY RECOVERY SYSTEM AND METHOD

BACKGROUND OF THE INVENTION

1. Field of the Invention

The present invention is related to cryptography, and, more particularly, to recovery of encrypted documents where the password is not available.

2. Description of the Related Art

Password recovery today is an important area of research and information security and information systems security. Many file formats today provide for encryption of the file content using a password entered by a user. For example, Microsoft Word, Microsoft Excel, Adobe Acrobat, as well as many others, provide for an encryption scheme that uses a key derived from a password entered by a user. Recovering the encrypted document may be necessary in any number of circumstances.

For example, the password may have been created by a former employee, who is no longer available to open the document. Alternatively, the password may have been lost or forgotten, while the document still needs to be opened by the system administrator. Yet another situation involves the system administrator testing documents and their passwords to make sure that the users are not relying on relatively simple passwords, or easily discoverable passwords that rely on information about the users themselves (for example, the user's name, the user's spouse's name, their pet's names, their names spelled backwards, etc.). These are some of the circumstances where a system administrator may need to recover the password, without assistance from whoever chose that password.

One common encryption scheme is known as a "stream cipher" encryption. In such a scheme, starting with a password, which is usually a collection of alphanumeric characters, a specific predefined algorithm is used to generate a key, which is an N-bit binary value. For reasons of export control regulations, many applications' keys are restricted to using no more than 40 bits. This means that the total number of keys is, obviously, $2^{40}$. However, it should be remembered that the stream cipher algorithms are not restricted to 40-bits-64-bit keys are also frequently used, as are 56-bit, 96-bit and 128-bit keys (at times).

In cryptography, a stream cipher is a symmetric cipher in which the plaintext digits are encrypted one at a time, and in which the transformation of successive digits varies during the encryption. The encryption of each digit is dependent on the current state. In practice, the digits are typically single bits or bytes.

In a synchronous stream cipher, a stream of pseudo-random digits is generated independently of the plaintext and ciphertext messages, and then combined with the plaintext (to encrypt) or the ciphertext (to decrypt). In the most common form, binary digits are used (bits), and the keystream is combined with the plaintext using the exclusive OR operation (XOR). This is a binary additive stream cipher.

RC4 is a common example of stream cipher used in encryption of many documents. Its description was anonymously posted on the Internet in 1994. RC4 generates a pseudorandom stream of bits (a "keystream") which, for encryption, is combined with the plaintext using XOR; decryption is performed the same way. To generate the keystream, the cipher makes use of a secret internal state that consists of two parts:

A permutation of all 256 possible bytes (denoted "S" below).

Two 8-bit index-pointers (denoted "i" and "j").

The permutation is initialized with a variable length key, typically between 40 and 256 bits, using a key-scheduling algorithm. Once this has been completed, the stream of bits is generated using the pseudo-random generation algorithm (PRGA).

The key-scheduling algorithm is used to initialize the permutation in the array "S". "L" is defined as the number of bytes in the key and can be in the range 1<L<256, typically between 5 and 16, corresponding to a key length of 40-128 bits. First, the array "S" is initialized to the identity permutation. S is then processed for 256 iterations similar to the main PRGA algorithm, but also mixes in bytes of the key at the same time:

for i from 0 to 255
S[i]:=i
j:=0
for i from 0 to 255
j:=(j+S[i]+key[i mod keylength]) mod 256
swap(S[i],S[j])

A number of conventional methods are known for recovering passwords. One conventional method involves using certain heuristics based on known information about the user. This can include such things as the user's first name, last name, spouse's or children's names, parents' names, Social Security numbers, names spelled backwards, pet's names, city names, addresses, etc. Since the amount of such information is relatively finite (and, in any event, much smaller than the theoretical number of keys—$2^{40}$,—in the case of the user using such obvious passwords, this would result in a very quick password recovery.

Where such heuristic approaches fail, the next step might involve using a dictionary. For example, the English language contains approximately 20,000 words, including variations on the spelling, conjugations of words, singular/plural, etc. The applications that encrypt their files, such as MS Word, or Adobe Acrobat, provide functions for checking the validity of the password—in other words, it is not necessary to invoke the entire application in an attempt to open the document itself—it is possible to simply use that function and provide the possible passwords to it as an argument, resulting in a success or failure as the return parameter.

The use of such built-in password checking functions (especially as a stand-alone code) has been optimized to a point where there are no additional savings to be gained from this approach—if the word selected by the user as a password is in the dictionary, then it can be predicted with a reasonable degree of certainty how many processor instructions per password need to be executed and, derivatively, the average time to find the valid password.

In the event that the dictionary approach fails, combinations of letters and numbers can be tried, for example, "aaa," "aab," "aac," etc. However, for six character or eight character (or longer passwords), such an approach becomes prohibitively time-consuming. In the case of an eight character English-language password, and where upper and lower case letters are treated as different symbols, plus ten digits, the total number of possible passwords is roughly $(2 \times 26 \pm 10)^8$. This is a very large number, and, given current technology, will take a very long time to result in a recovery of a password. Languages with more than 26 letters would result in more possible passwords.

An alternative brute force approach is to focus not on the passwords, but directly on the keys. Microsoft Word and Adobe Acrobat, and other similar programs have a function that allows one to test whether the key submitted to it is the valid one. By going through all the possible keys, of which, in the 40-bit scheme, there are $2^{40}$, eventually a correct key will be found. The stream cipher encryption algorithms guarantee that for any possible password, there is at least one valid 40-bit key (and possibly more than one). This is a scheme that is, in fact, frequently used. Given current technology, on a typical desktop, in 2006, with a 40-bit key, it would take approximately two weeks, on average, to find the valid key.

This has significant implications for the field of password protection and document recovery. A task that requires a dedicated computer for one or two weeks is not one that will be undertaken routinely. Solutions that attempt to use parallel processing, such as using multiple computers to solve this problem, where each computer only works on some portion of the total task, are possible but relatively expensive. Furthermore, such solutions (e.g., server farms, parallel processing supercomputers, etc.) are clearly outside the realm of individual users or small businesses, but are, in practice, restricted to the corporate environment, primarily due to cost considerations.

Another alternative was proposed three years ago, based on the 1980 work of Martin Hellman, see http://lasecwww.eph-fl.ch/pub/lasec/doc/Oech03.pdf. This approach involves what is sometimes referred to as the "Rainbow Table." A Rainbow Table is a special type of lookup table that is constructed by placing a plaintext password entry in a chain of keys and ciphertexts, generated by a one-way function, such as a hash. The end result is a table that contains, statistically, high probability of revealing a password within a short period of time, generally less than a minute. The success probability of the table depends on the parameters used to generate it. These include the character set used, password length, chain length, and table count.

Success probability is defined as the probability that the plaintext can be found for a given ciphertext. In the case of passwords, the password is the plaintext, and the hash of the password is the ciphertext, so the success probability is the probability that the original password can be recovered from the password hash. Tables are specific to the hash function they were created for, e.g., MD5 tables can only crack MD5 hashes. Rainbow Tables for a variety of character sets and hashing algorithms have been developed, including LM hash, MD5, SHA1, etc.

The Rainbow Table approach has two major disadvantages. One disadvantage is that it does not give a 100% guarantee of finding the password, if hashes are used. Typically, the Rainbow Table approach gives a 99%, or 99.5%, or 99.9% probability of finding the password. The "missing" 1% or 0.1%, is of more than a theoretical significance in many cryptographic applications. Another problem with the Rainbow Table approach is that it is primarily used on Windows-encrypted documents, which use LM-hashes of Windows passwords, which is equivalent to 29-bit keys—in other words, there are only $2^{29}$ possible passwords that need to be tested. This is far fewer than the $2^{40}$ possible keys in the Microsoft Word or Adobe Acrobat documents. Attempting to use the Rainbow Table approach with 40-bit keys would substantially increase the time required (which is approximately 30 seconds, depending on the hardware, for 29-bit keys).

Accordingly, there is a need in the art for a fast system and method for recovering keys for encrypted documents.

SUMMARY OF THE INVENTION

Accordingly, the present invention is related to a system and method for rapid encrypted document recovery that substantially obviates one or more of the disadvantages of the related art.

In one aspect, there is provided a system, method and computer program product for recovering a key used to produce a ciphertext document from a plaintext document, including, in the ciphertext document encrypted using an N-bit key, identifying location of an M-bit control value; converting the control value to an M-bit portion of a gamma that corresponds to (a) the ciphertext document and (b) the N-bit key; accessing a file that corresponds to the M-bit portion of the gamma, wherein the file includes approximately $2^{N-M}$ keys that correspond to the M-bit portion of the gamma out of the $2^N$ keys; testing the $2^{N-M}$ keys using a cryptographic key validity function, until a valid key is found; and decrypting the ciphertext document using the valid key to produce the plaintext document. The keys in the file can be tested sequentially. The file can be requested from a server prior to accessing it, or can be local. The name of the file can include the M-bit portion of the gamma. The ciphertext document can be encrypted, for example, using a symmetric stream cipher. In one example, N=40 and M=16. More generally, usually M<N.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the embodiments of the present invention, examples of which are illustrated in the accompanying drawings.

Figure 1:
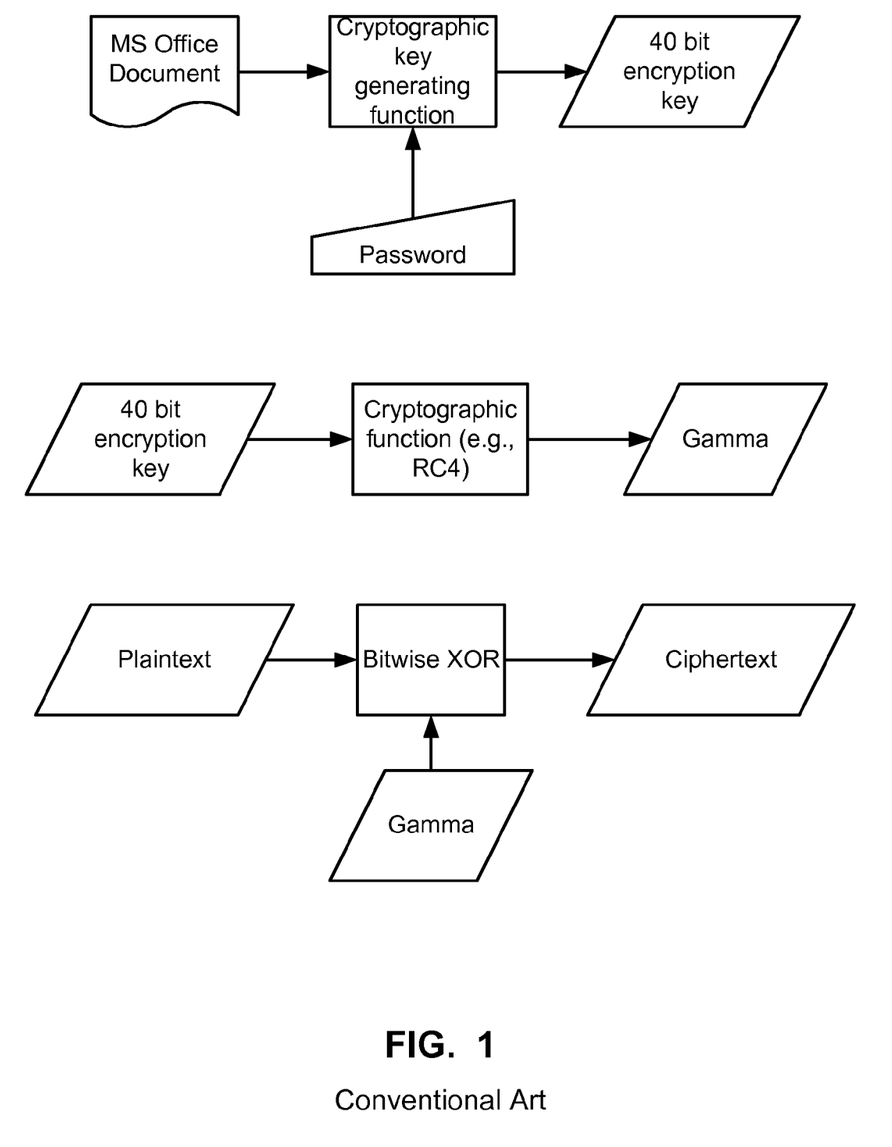
FIG. 1 illustrates the interaction of the various elements used in encryption of a document.

FIG. 1 illustrates the interaction of the various elements used in encryption of a document. As shown in FIG. 1, in order to generate an encryption key, a password is used as an input to a cryptographic key generating function. For example, Microsoft Office has such a cryptographic key generating function, however, the function can be implemented as a standalone program or procedure, since the key generating algorithm is generally well known. Thus, using a password as an input, a 40-bit key (in this case) is generated. There are, obviously, with 40-bits, $2^{40}$ possible keys.

Moving downward in FIG. 1, the 40-bit key is used to generate what is called a "gamma." A gamma is a set of bits whose size is equal to the file that needs to be encrypted. For example, for a 100 kilobyte file, the gamma is also 100 kilobytes. Gamma is generated based on the 40-bit key using a known cryptographic algorithm, for example, RC4, as well as any number of others. It should be noted that, for a good cryptographic algorithm, the gamma is unique for each of the 40-bit keys.

Moving to the bottom of FIG. 1, the document that needs to be encrypted is known as "plaintext." The encrypted document is known as "ciphertext." The ciphertext is produced by a bit-wise exclusive OR operation of the plaintext and the gamma, resulting in the encrypted ciphertext document.

The present invention is based on the fact that for many of the file formats, there is certain data at specific positions in the encrypted files (so-called "control value") whose value is known both before encryption and after encryption. For example, in the Microsoft Office documents, this is a two-byte value, known as "File Information Block," located at offset address 0x200 within the file, and, in the case of MS Office documents, the two-byte value at that address is always 00(hex). The File Information Block is derived from the application (e.g., Microsoft Word, Excel, etc.) and the version of the application used to create the file. Similar control values are found in, for example, PDF documents (in the case of PDF documents, the control value is actually 32 bits, but only 2 bytes are needed for most practical applications of the algorithm described herein). Thus, for any given encrypted document, we know both the plaintext control value and the ciphertext control value, which are found at the same position. The algorithm described herein takes advantage of that fact.

Figure 2:
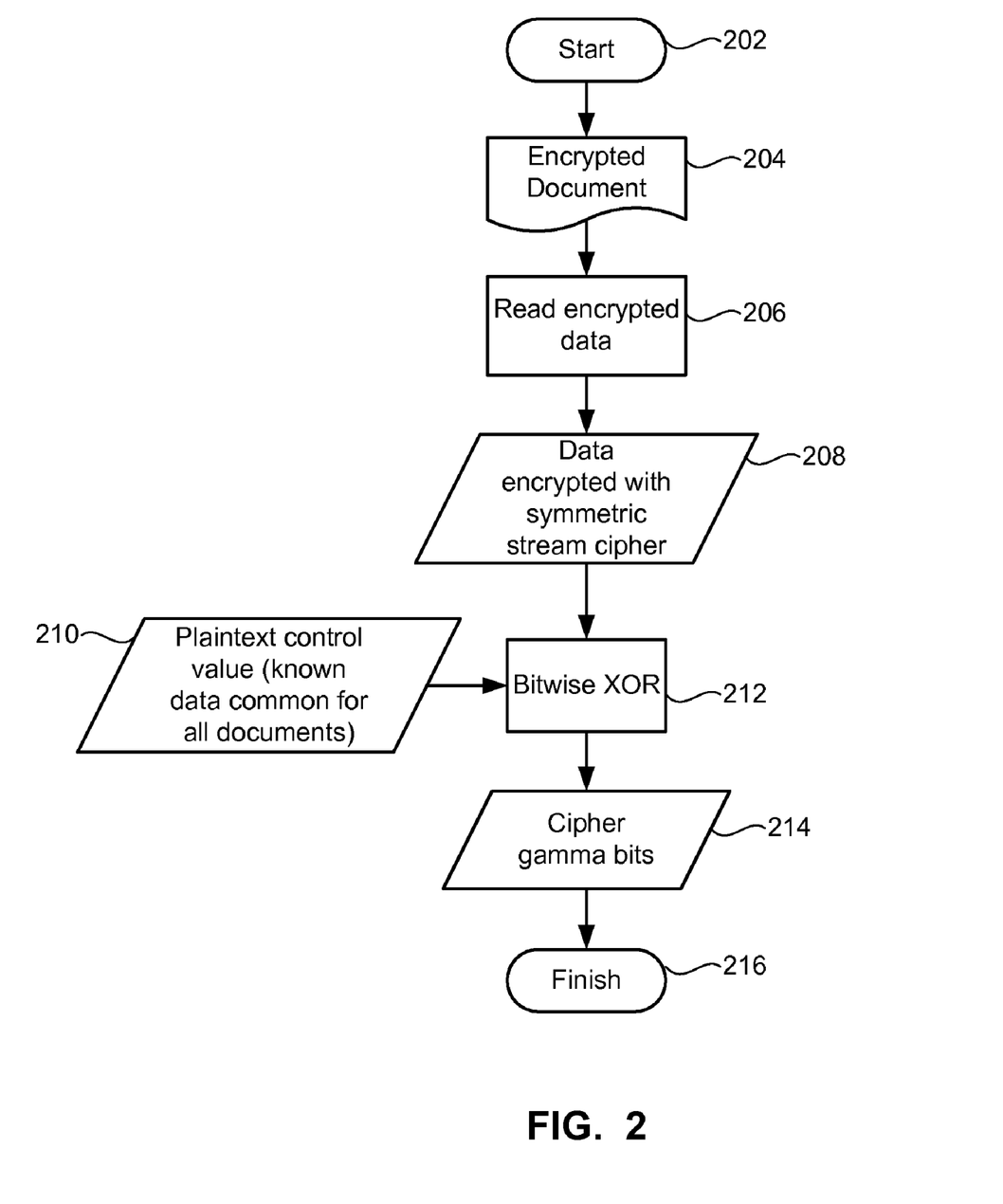
FIG. 2 illustrates an exemplary algorithm for identifying a gamma fragment to be used in subsequent key validation.

Turning now to FIG. 2, after the start of the algorithm in step 202, the algorithm identifies the encrypted document (step 204) and then reads the encrypted data (step 206). The algorithm then checks that the file has been encrypted using a symmetric stream cipher (step 208), and identifies the encrypted control value (in this case, a two-byte control value). In step 210, the plaintext control value is retrieved, or, in the case of MS Office documents, known in advance to be 00 (hex). In step 218, the encrypted control value and the plaintext control value are exclusive OR'ed together. Note that exclusive OR is a reversible operation. By performing the exclusive OR in this manner, the gamma bits corresponding to the two-byte control value are generated (step 214). The gamma identification algorithm then finishes in step 216. The result of this is that the number of possible keys has been reduced from $2^{40}$ to $2^{24}$, a factor of 65,536 reduction.

Figure 3:
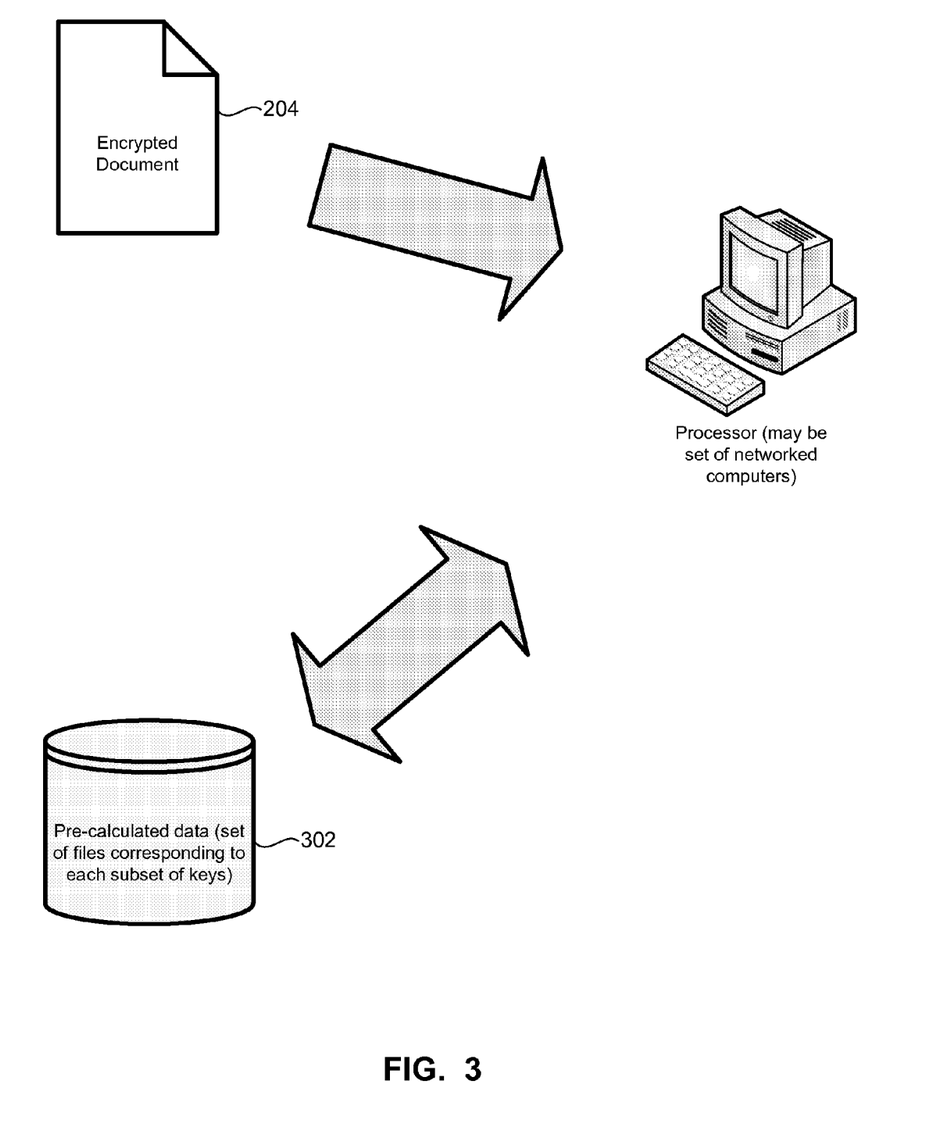
FIG. 3 illustrates the interaction between the encrypted document and the file set.

FIG. 3 illustrates another aspect of the invention, that is, the fact that the keys corresponding to the all the possible 2-byte values in the gamma that correspond to the control value can be pre-generated (see also discussion of FIG. 5 below). As noted earlier, there are $2^{40}$ possible keys for a 40-bit key. Each of the keys corresponds to one 2-byte value of gamma (out of 65,536 possible), however, for each of the 2-byte gamma values, there are approximately $2^{24}$ possible keys. Thus, the database 302, shown in FIG. 3, which contains all the possible $2^{40}$ keys, can be divided, for example, into 65,536 files (more generally, the number of files is some power of 2), each file containing roughly $2^{24}$ keys. To make searching and indexing easier, the name of each file, for example, can incorporate the 2-byte fragment of the gamma that corresponds to the plaintext control value. The 2-byte gamma fragment therefore can serve as an index, e.g., as part of a file name, so that by selecting an appropriate one of the 65,536 files in the database 302, we are guaranteed that, in that file, at least one of the $2^{24}$ keys will be the valid one.

Each of the 65,536 files needs to be pre-generated, however, this only needs to be done once for all the possible $2^{40}$ keys. The size of the database 302 is roughly on the order of 3 terabytes, which is a relatively manageable number, given current computing and storage technology.

With FIGS. 2 and 3 in mind, it is now possible to find the key by examining only one of the 65,536 files and the $2^{24}$ keys in that particular file, rather than brute-force sequentially testing all of the $2^{40}$ keys.

Figure 4:
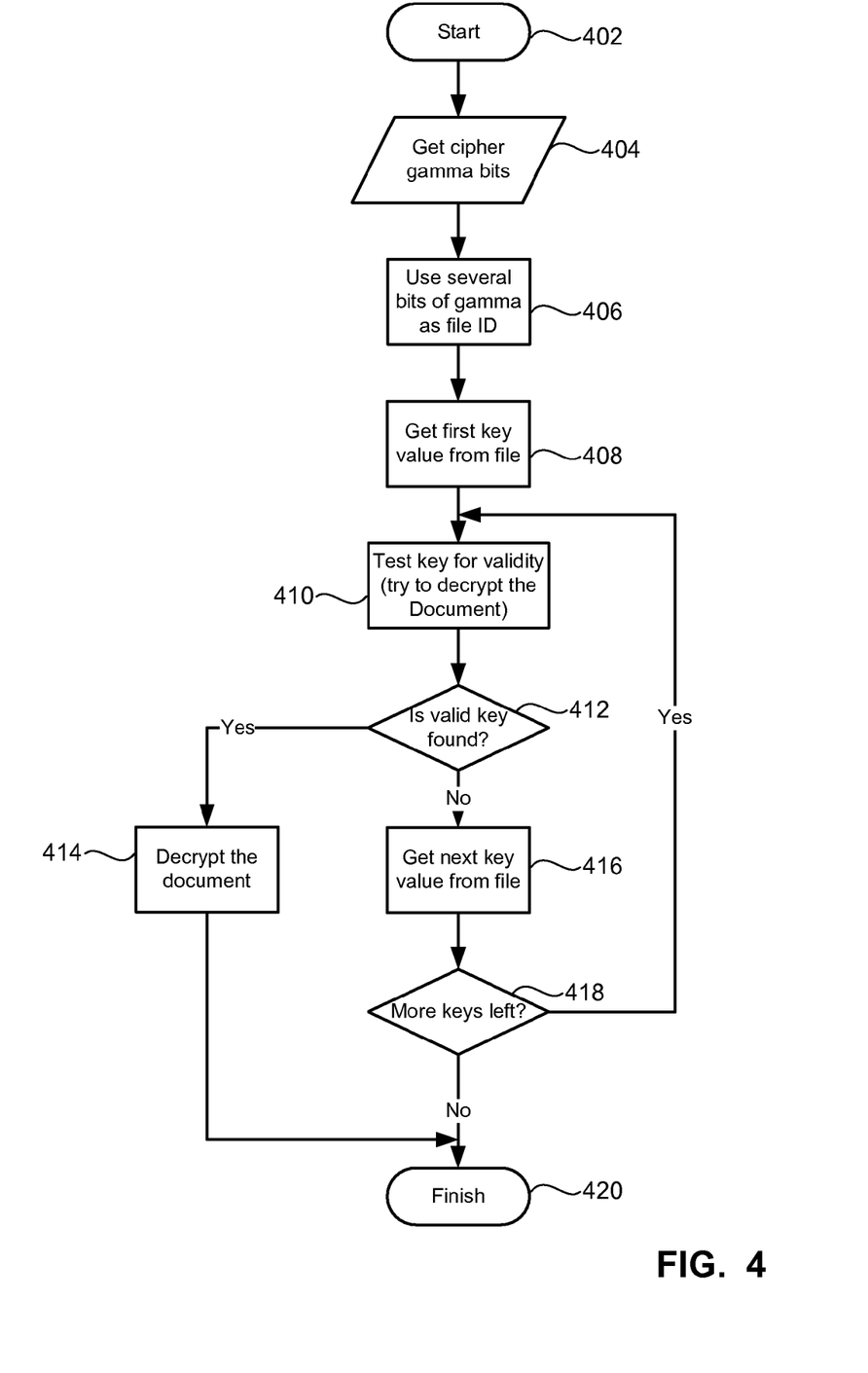
FIG. 4 shows an exemplary key validation algorithm.

Turning now to FIG. 4, the key identification algorithm starts in step 402. In step 404, the cipher gamma bits are received, either from the file directly, or otherwise. These cipher gamma bits (in other words, the 2-byte quantity in the gamma that corresponds to the control value) can be used as a file ID, or an index in to a database (step 406). In step 408, the first key of the $2^{24}$ keys in that file is retrieved. In step 410, the key is tested, using a cryptographic verification function that validates (or not validates) the key, for validity. In step 412, if the key is valid, then, in step 414, the document can be decrypted and the plaintext document generated. If, in step 412, the key is not valid, then, in step 416, the next key in the file can be retrieved. If there are more keys, in step 418, then the algorithm returns to step 410. Otherwise, the algorithm finishes in step 420.

Figure 5:
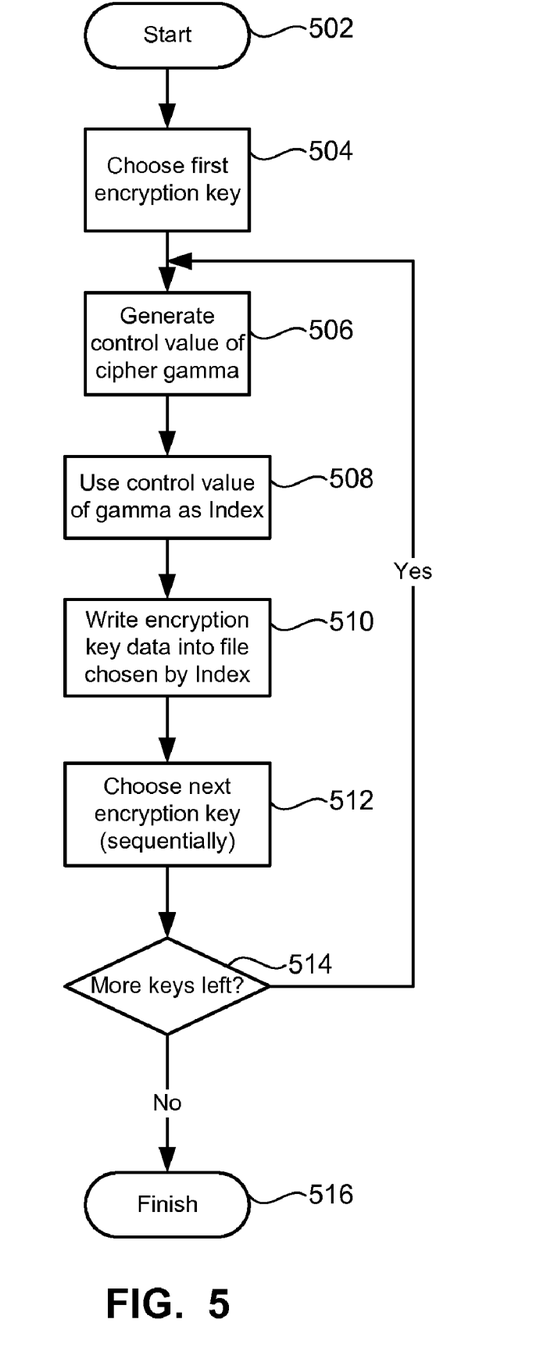
FIG. 5 shows an exemplary algorithm for generating an indexed database of files and keys that correspond to the gammas.

FIG. 5 illustrates the algorithm used to generate the database 302. As shown in FIG. 5, after the algorithm that generates the database 302 starts, in step 502, the first encryption key is selected (for example, the key that contains all zeros as the 40-bits (step 504)). In step 506, the control value of the gamma that corresponds to that key is generated. In step 508, that control value is used as an index into the database 302. The key is written to the corresponding file in the database 302 (step 510). The next key is then chosen sequentially (for example, the second key would be 0000000001 (hex), the third 0000000002 (hex), etc.). In step 514, if there are more keys left, then the algorithm returns to step 506. Otherwise, the algorithm finishes in step 516.

Figure 6:
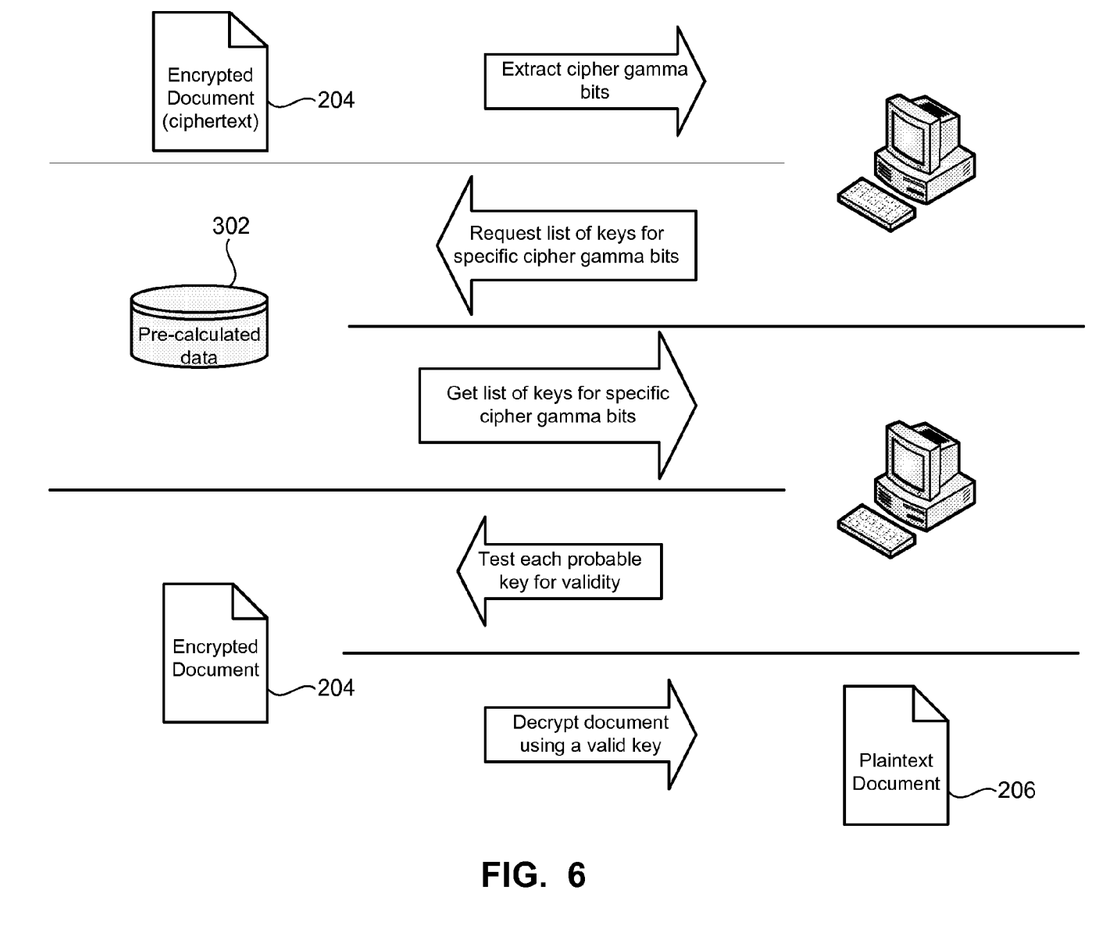
FIG. 6 is another illustration of the key identification algorithm, in different layout.

FIG. 6 is another illustration of the algorithm, in somewhat different layout. As shown in FIG. 6, starting with the encrypted document 204, cipher gamma control value bits are extracted. Typically, a user at a client computer will then request a list of keys for the specific cipher gamma bits that he extracted from the encrypted document 204. For example, this can be done by requesting a file from a server, where the server receives, as part of the file name, the cipher gamma bits. The server then returns a file back to the user, where the file is one of the 65,536 files and contains roughly $2^{24}$ keys.

Note that such a file is approximately 5 megabytes in size, which, given today's broadband connections, is a relatively trivial task to download. The algorithm can then test each of the $2^{24}$ keys for validity, as discussed above. With current technology, this process, on commercially available desktop computers, will take approximately 20-30 seconds. Once the key has been identified, the user can decrypt the document using the key, and generate the plaintext document 206. Thus, the process takes advantage of the fact that rather than focusing on passwords, a focus on finding the right key actually speeds up the decryption process by 4-5 orders of magnitude.

The actual implementation of the algorithm can be done in any number of ways. For example, the database 302 can be located on a remote server, and the user only needs to download one of the 65,536 files with the subset of keys. Alternatively, the entire database 302 can be local to the user. As yet another option all the activity, both the generation of the database 302, the maintenance of the database 302, and the algorithm that test the keys for validity, can be performed remotely. In other words, there are any number of possibilities for distributing the activities between the client computer and a server.

Furthermore, as noted earlier, the algorithm is not limited to the particular embodiments that are specific to Microsoft Office and Adobe Acrobat. Mathematically, the algorithm is applicable to any stream cipher-encoded document where some data in the document is known both before and after encryption. Also, the algorithm is not limited to the 2-byte value discussed above, which is, obviously, exemplary—the known data (control value) may be more or less than 2-bytes, with the obvious implication for the amount of time that the algorithm would therefore require.

Although the discussion so far has been primarily in the context of 40-bit keys, which, with 2006 desktop computers would take approximately 20-30 seconds to recover, the invention is not limited to any particular key length. For example, all the scalability techniques known in the art can be combined with the approach discussed herein. In the case of 64-bit keys, the task can be broken up along a number of computers, making the problem more manageable. (It is worth noting that none of the conventional approaches can handle 64-bit key recovery in a brute force manner in any even remotely reasonable time). Similarly, the problem of recovering 128-bit keys can be addressed as well—in other words, there are no algorithmic or mathematical limitations on how many bits the key can have, the decision is essentially one of a cost benefit and engineering tradeoffs.

Also, for 40-bit keys, the storage 302 requires approximately three Terabytes, which desktop computers in 2006 can readily address, and which costs approximately $1,500. This is well within the parameters that even individual users can afford. For longer keys, obviously a greater amount of storage will be needed. Today, storage on the order of 500 Terabytes, for example (which would be needed for longer keys, e.g., for a 64 bit key), is the province of large corporations, but, the price of storage continues to go down relatively rapidly, and the ability to address such storage (and deal with longer keys) is also only a matter or engineering and cost-benefit tradeoffs.

Furthermore, although the discussion so far has been in the context of 40-bit keys and a 2-byte control value, it should be noted that many files have other data that is known both before and after. For example, some file control characters (e.g., end of file, EOF) as well as others, may be known both before and after encryption. Therefore, the control value can be longer than 2-bytes, even though physically the entire control value is not located at a single sequential location in the file. Therefore, for example, if one additional byte of the gamma is used as a control value (in other words, a total of $2^{24}$, or 65,536×256 files will be used, with each file having $2^{16}$ keys. For 40-bit keys, this is unnecessary, since an algorithm that performs its task in 20-30 seconds is sufficiently fast for most applications. On the other hand, the downside is that the number of files increases by a factor of 256, making file management something of an issue.

However, as discussed earlier, the mathematics of the approach are not limited to 40-bit keys, but can be applied to longer keys. For instance, with 56-bit keys and an encryption scheme that uses a 2-byte control value as discussed above, plus an additional 1 byte somewhere in the file that also functions as a control value, the problem is reduced to having $2^{24}$ files, each file having $2^{32}$ keys. The storage requirements for this are obviously larger than for earlier-described case, but these are manageable in the context of corporate or government applications. In this example, finding the valid key would take roughly two weeks—compared to conventional brute force approaches, which cannot solve the 56-bit key problem in any reasonable time at all.

It will also be appreciated that although the discussion herein has been primarily in terms of implementing the invention in the form of software, the invention can also be implemented entirely or partially in hardware. For instance, the module for testing the validity of the key can be implemented in hardware, dedicated hardware can easily be designed for implementing other functionality in hardware, or partly in hardware.

Figure 7:
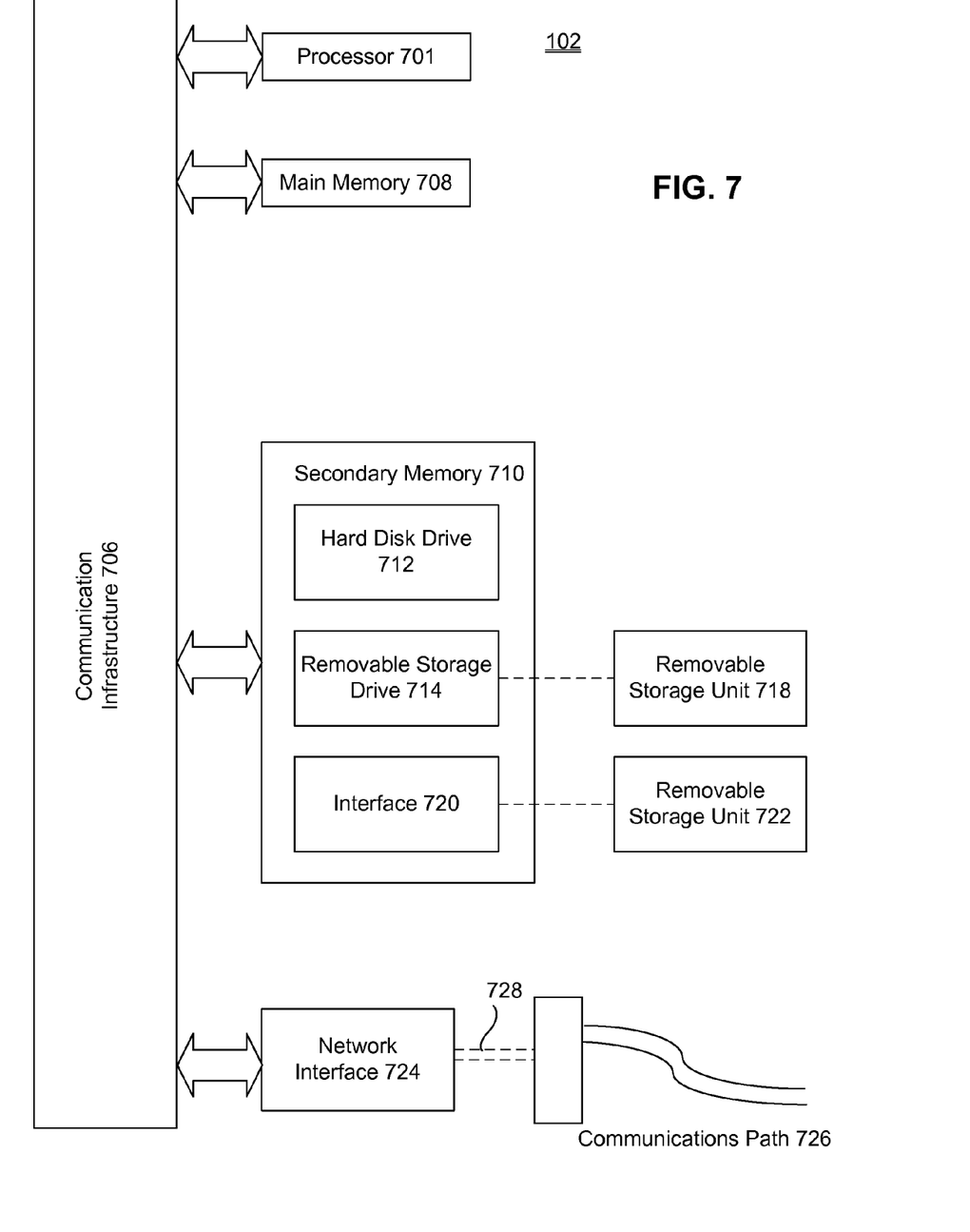
FIG. 7 is a schematic diagram of an exemplary computer or server that can be used in the invention.

An example of the computer system 102 on which the invention may be implemented is illustrated in FIG. 7. The computer system 102 includes one or more processors, such as processor 701. The processor 701 is connected to a communication infrastructure 706, such as a bus or network). Various software implementations are described in terms of this exemplary computer system. After reading this description, it will become apparent to a person skilled in the relevant art how to implement the invention using other computer systems and/or computer architectures.

Computer system 102 also includes a main memory 708, preferably random access memory (RAM), and may also include a secondary memory 710. The secondary memory 710 may include, for example, a hard disk drive 712 and/or a removable storage drive 714, representing a magnetic tape drive, an optical disk drive, etc. The removable storage drive 714 reads from and/or writes to a removable storage unit 718 in a well known manner. Removable storage unit 718 represents a magnetic tape, optical disk, or other storage medium that is read by and written to by removable storage drive 714. As will be appreciated, the removable storage unit 718 can include a computer usable storage medium having stored therein computer software and/or data.

In alternative implementations, secondary memory 710 may include other means for allowing computer programs or other instructions to be loaded into computer system 102. Such means may include, for example, a removable storage unit 722 and an interface 720. An example of such means may include a removable memory chip (such as an EPROM, or PROM) and associated socket, or other removable storage units 722 and interfaces 720 which allow software and data to be transferred from the removable storage unit 722 to computer system 102.

Computer system 102 may also include one or more communications interfaces, such as communications interface 724. Communications interface 724 allows software and data to be transferred between computer system 102 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path (i.e., channel) 726. This channel 726 carries signals 728 and may be implemented using wire or cable, fiber optics, an RF link and other communications channels. In an embodiment of the invention, signals 728 comprise data packets sent to processor 701. Information representing processed packets can also be sent in the form of signals 728 from processor 701 through communications path 726.

The terms "computer program medium" and "computer usable medium" are used to generally refer to media such as removable storage units 718 and 722, a hard disk installed in hard disk drive 712, and signals 728, which provide software to the computer system 102.

Computer programs are stored in main memory 708 and/or secondary memory 710. Computer programs may also be received via communications interface 724. Such computer programs, when executed, enable the computer system 102 to implement the present invention as discussed herein. In particular, the computer programs, when executed, enable the processor 701 to implement the present invention. Where the invention is implemented using software, the software may be stored in a computer program product and loaded into computer system 102 using removable storage drive 714, hard drive 712 or communications interface 724.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method of recovering a key used to produce a ciphertext document from a plaintext document, the method comprising:

configuring a processor to perform the functions of:

identifying location of an M-bit control value in the ciphertext document encrypted using an N-bit key;

converting the control value to an M-bit portion of a gamma that uniquely corresponds to (a) the ciphertext document and (b) the N-bit key;

accessing a file that corresponds to the M-bit portion of the gamma of the cipher text document which serves as an index to select the file, wherein the file includes approximately $2^{N-M}$ keys that correspond to the M-bit portion of the gamma out of the $2^N$ keys;

testing the $2^{N-M}$ keys using a cryptographic key validity function, until a valid key is found and recovered; and decrypting the ciphertext document using the valid recovered key to produce the plaintext document.

2. The method of claim 1, wherein the keys in the file are tested sequentially.

3. The method of claim 1, further comprising requesting the file is from a server prior to accessing it.

4. The method of claim 1, wherein the file is requested from a server and wherein a name of the file includes the M-bit portion of the gamma.

5. The method of claim 1, wherein the ciphertext document is encrypted using a symmetric stream cipher.

6. The method of claim 1, wherein N=40 and M=16.

7. The method of claim 1, wherein the $2^{N-M}$ keys are tested sequentially.

8. The method of claim 1, wherein the control value is a File Information Block.

9. The method of claim 1, wherein M<N.

10. A system for recovering a key used to produce a ciphertext document from a plaintext document, the system comprising:

a plurality of $2^M$ files, each file containing to a subset of approximately $2^{N-M}$ keys out of a total of $2^N$ keys, wherein the keys in each file correspond to an M-bit portion of a gamma;

means for identifying, in the ciphertext document encrypted using an N-bit key, location of an M-bit control value;

means for converting the control value to the M-bit portion of the gamma that uniquely corresponds to (a) the ciphertext document and (b) the N-bit key;

means for accessing a file, out of the plurality of M files, that corresponds to the M-bit portion of the gamma of the cipher text document which serves as an index to select the file, wherein the file includes approximately $2^{N-M}$ keys that correspond to the M-bit portion of the gamma out of the $2^N$ keys;

means for testing the $2^{N-M}$ keys in the file using a cryptographic key validity function until a valid key is found and recovered; and means for decrypting the ciphertext document using the valid recovered key to produce the plaintext document.

11. The system of claim 10, wherein the M files are located on a remote server for download.

12. The system of claim 10, wherein the file being accessed is downloaded from the remote server, and wherein a name of the file includes the M-bit portion of the gamma.

13. The system of claim 10, wherein the M files are located on a local drive.

14. The system of claim 10, wherein the keys in the file are tested sequentially.

15. The system of claim 10, wherein the ciphertext document is encrypted using a symmetric stream cipher.

16. The system of claim 10, wherein the control value is a File Information Block.

17. A computer program product for recovering a key used to produce a ciphertext document from a plaintext document, the computer program product embedded on a computer readable storage medium having computer program logic stored thereon for executing on a processor, the computer program logic comprising:

computer program code means for identifying location of an M-bit control value in the ciphertext document encrypted using an N-bit key;

computer program code means for converting the control value to an M-bit portion of a gamma that uniquely corresponds to (a) the ciphertext document and (b) the N-bit key;

computer program code means for accessing a file that corresponds to the M-bit portion of the gamma of the cipher text document which serves as an index to select the file, wherein the file includes approximately $2^{N-M}$ keys that correspond to the M-bit portion of the gamma out of the $2^N$ keys;

computer program code means for testing the $2^{N-M}$ keys using a cryptographic key validity function, until a valid key is found and recovered; and computer program code means for decrypting the ciphertext document using the valid recovered key to produce the plaintext document.

18. A system for recovering a key used to produce a ciphertext document from a plaintext document, the system comprising:

generating a plurality of $2^M$ files, each file containing to a subset of approximately $2^{N-M}$ keys out of a total of $2^N$ keys, wherein the keys in each file correspond to an M-bit portion of a gamma;

means for identifying, in the ciphertext document encrypted using an N-bit key, location of an M-bit control value;

means for converting a control value to the M-bit portion of the gamma that uniquely corresponds to (a) the ciphertext document and (b) the N-bit key;

means for identifying a file, out of the plurality of M files, that corresponds to the M-bit portion of the gamma of the ciphertext document which serves as an index to select the file;

means for accessing the file, wherein the file includes approximately $2^{N-M}$ keys that correspond to the M-bit portion of the gamma out of the $2^N$ keys;

means for testing the $2^{N-M}$ keys in the file using a cryptographic key validity function until a valid key is found and recovered; and means for providing, to a user, one of (a) the valid recovered key, and (b) a plaintext document from the ciphertext document decrypted with the valid recovered key.

* * * * *